(12) United States Patent
Vallelonga et al.

(10) Patent No.: US 11,994,880 B2
(45) Date of Patent: May 28, 2024

(54) METHODS AND SYSTEMS FOR UNMANNED AERIAL VEHICLES TO DETECT AND AVOID OTHER FLYING MACHINES

(71) Applicant: KUTTA TECHNOLOGIES, INC., Phoenix, AZ (US)

(72) Inventors: Robert Vallelonga, Glendale, AZ (US); Douglas V. Limbaugh, Phoenix, AZ (US)

(73) Assignee: Kutta Technologies, Inc., Phoenix, AZ (US)

( * ) Notice: Subject to any disclaimer, the term of this patent is extended or adjusted under 35 U.S.C. 154(b) by 244 days.

(21) Appl. No.: 17/225,882

(22) Filed: Apr. 8, 2021

(65) Prior Publication Data

US 2022/0100209 A1 Mar. 31, 2022

Related U.S. Application Data

(60) Provisional application No. 63/084,743, filed on Sep. 29, 2020.

(51) Int. Cl.
*G05D 1/00* (2006.01)
*B64C 39/02* (2023.01)
(Continued)

(52) U.S. Cl.
CPC ........... *G05D 1/106* (2019.05); *B64C 39/024* (2013.01); *G05D 1/0022* (2013.01);
(Continued)

(58) Field of Classification Search
CPC .... G05D 1/106; G05D 1/0022; G05D 1/0027; G05D 1/104; B64C 39/024; G08G 5/003; B64U 2201/20; B64U 2101/00
See application file for complete search history.

(56) References Cited

U.S. PATENT DOCUMENTS

| 8,437,956 B2 | 5/2013 | Limbaugh et al. |
| 2010/0121575 A1* | 5/2010 | Aldridge ................ G08G 5/045 |
| | | 701/301 |

(Continued)

FOREIGN PATENT DOCUMENTS

| GB | 1070277 | 6/1967 | |
| WO | WO-2019023322 A1 * | 1/2019 | ............. B64C 13/16 |

OTHER PUBLICATIONS

International Search Report on corresponding PCT application (PCT/US2021/050963) from International Searching Authority (EPO) dated Jul. 13, 2022.

(Continued)

*Primary Examiner* — Anne Marie Antonucci
*Assistant Examiner* — Jared C Bean
(74) *Attorney, Agent, or Firm* — Mintz Levin Cohn Ferris Glovsky and Popeo, P.C.

(57) ABSTRACT

Methods and systems for unmanned aerial vehicles are provided. One method includes receiving, by a control system, sensor data from a mobile ground-based platform and sensor data from a ground-based radar surveillance system, the control system configured to communicate with a first UAV and a second UAV; detecting, by the control system, an object likely to impede the second UAV flight within a flight path, the object detected based on the sensor data received from the mobile ground-based platform, the ground-based radar surveillance system or both the ground-based radar surveillance system and the mobile ground-based platform; generating, by the control system, an indicator indicating an object in the flight path; and transmitting, by the control system, the indicator to the first UAV.

20 Claims, 12 Drawing Sheets

(51) Int. Cl.
   *B64U 101/00*     (2023.01)
   *G08G 5/00*     (2006.01)

(52) U.S. Cl.
   CPC ........... *G05D 1/0027* (2013.01); *G05D 1/104* (2013.01); *G08G 5/003* (2013.01); *B64U 2101/00* (2023.01); *B64U 2201/20* (2023.01)

(56) References Cited

U.S. PATENT DOCUMENTS

| | | | |
|---|---|---|---|
| 2018/0181125 A1* | 6/2018 | Ceccom | G08G 5/025 |
| 2019/0212752 A1* | 7/2019 | Fong | G06V 10/82 |

OTHER PUBLICATIONS

Written Opinion on corresponding PCT application (PCT/US2021/050963) from International Searching Authority (EPO) dated Jul. 13, 2022.

U.S. Army Unmanned Aircraft Systems; Army GBSAA Prepared for RTCA SC-228; Aug. 2, 2019; 38 pages.

\* cited by examiner

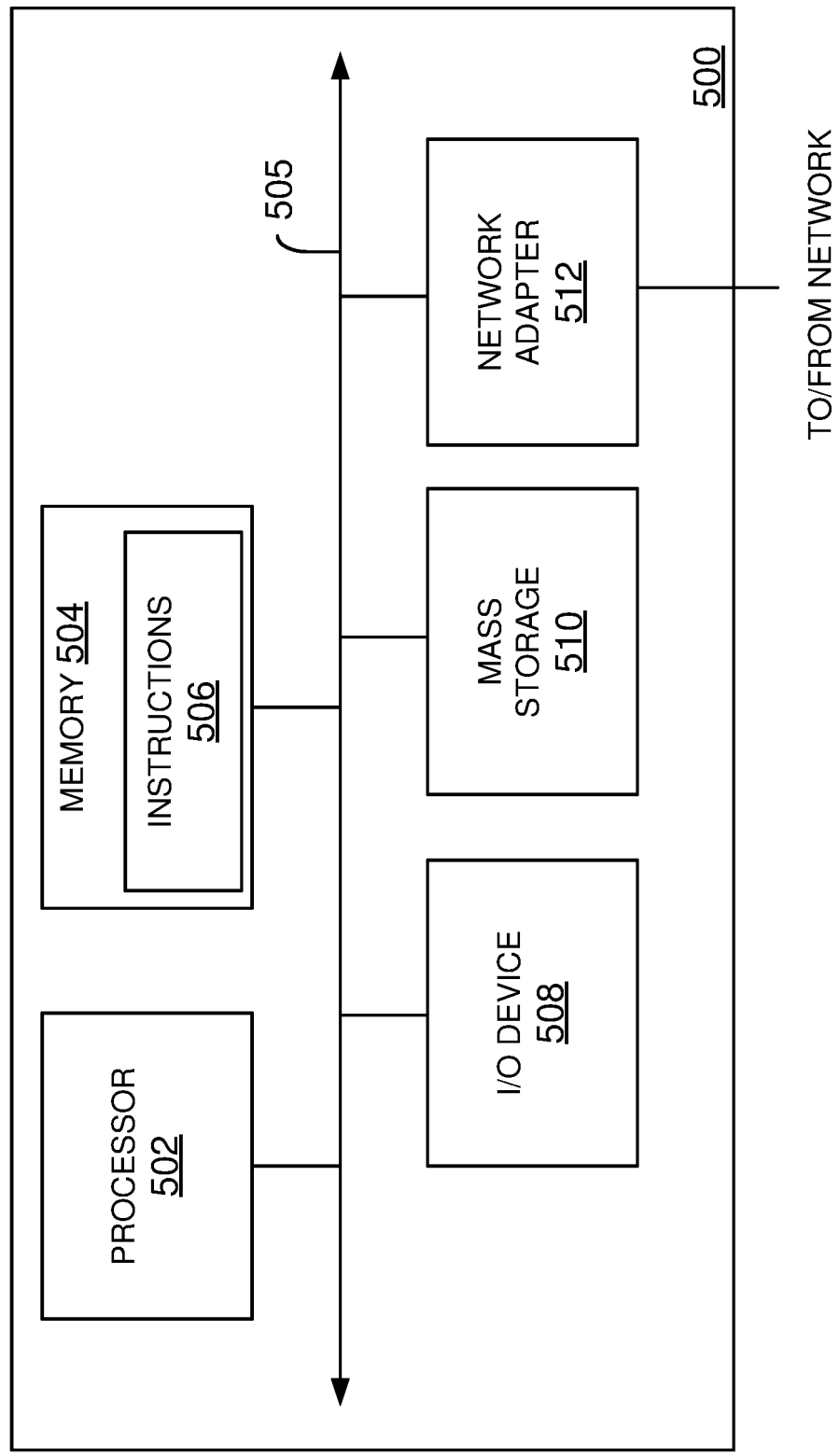

METHODS AND SYSTEMS FOR UNMANNED AERIAL VEHICLES TO DETECT AND AVOID OTHER FLYING MACHINES

CROSS-REFERENCE TO RELATED APPLICATIONS

This patent application claims priority under 35 USC § 119(e) to US Provisional Patent Application, Ser. No. 63/084,743, filed on Sep. 29, 2020, entitled "Methods and Systems for Unmanned Aerial Vehicles to Detect and Avoid Other Flying Machines," the disclosure of which is incorporated herein by reference in its entirety.

TECHNICAL FIELD

The present disclosure is generally related to unmanned aerial vehicles (UAVs), and more particularly, to innovative sense/detect and avoid technology for UAVs.

BACKGROUND

A UAV commonly referred as a "drone" is an aircraft without a human pilot on board. A UAV is a component of unmanned aircraft system that also typically includes a ground-based controller, and a communication system that enables communication between the UAV and the ground-based controller. UAV's continue to become popular for both military and civilian functions.

To reduce the potential of midair collisions, all aircraft, manned or UAVs must comply with Title 14 of the Code of Federal Regulations (14 CFR) § 91.113 that states "When weather conditions permit, regardless of whether an operation is conducted under instrument flight rules or visual flight rules, vigilance shall be maintained by each person operating an aircraft so as to see and avoid other aircraft." Since UAVs do not have the benefit of a pilot on board to see and avoid other airborne machines (e.g. aircraft, helicopters, drones and others), sense and avoid (also referred to as "detect and avoid", used interchangeably throughout this document) technology becomes necessary. Continuous efforts are being made to develop sense and avoid technology that provides a safe and flexible, transit corridor (i.e. geographical air space) to a UAV, limiting potential midair collisions.

BRIEF DESCRIPTION OF THE DRAWINGS

The various features of the present disclosure will now be described with reference to the drawings of the various aspects disclosed herein. In the drawings, the same components may have the same reference numerals. The illustrated aspects are intended to illustrate, but not to limit the present disclosure. The drawings include the following Figures:

FIG. 5 shows a block diagram of a computing system, used according to various aspects of the present disclosure.

DETAILED DESCRIPTION

Figure 1A:
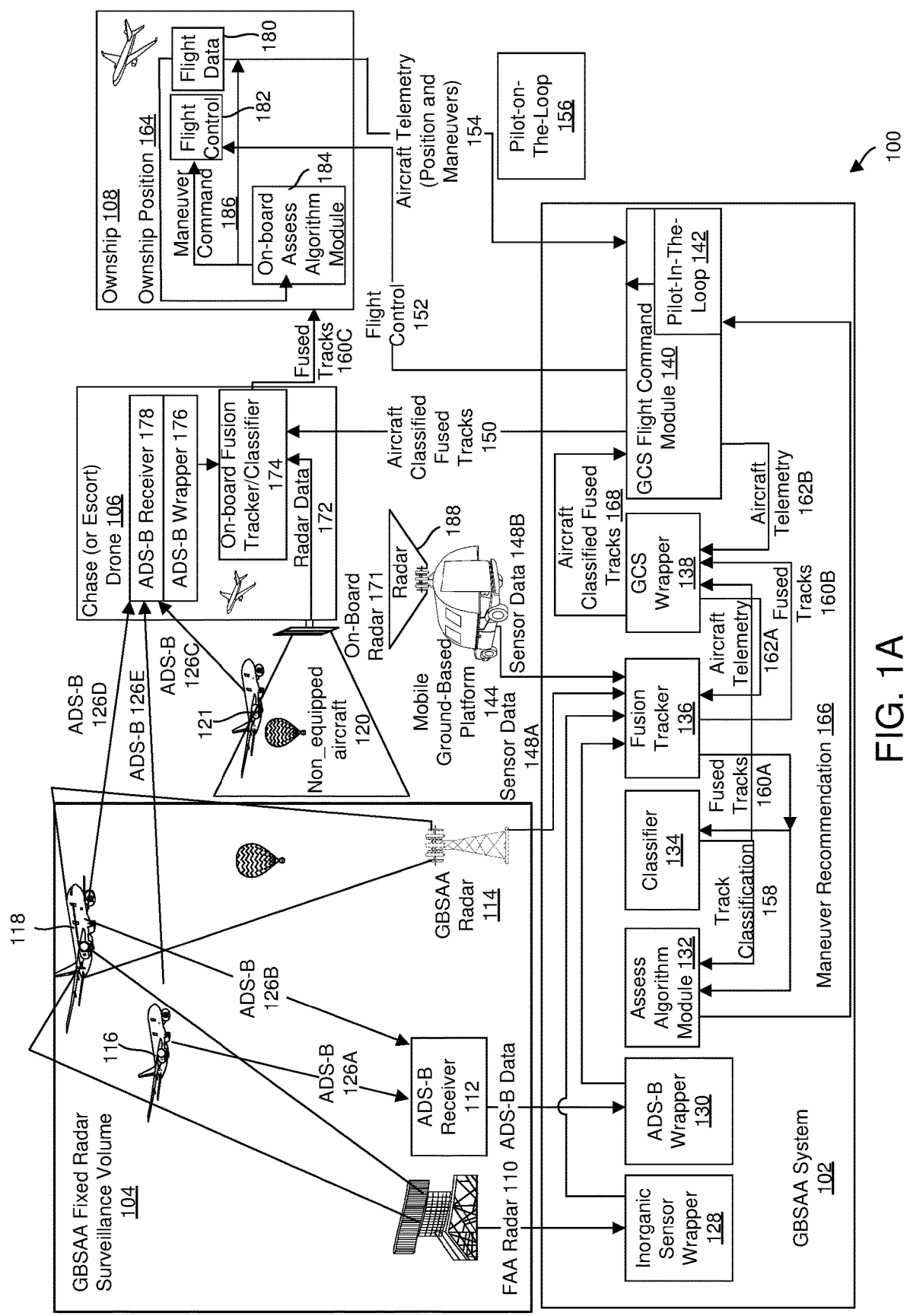
FIG. 1A shows an example of an innovative system architecture, according to various aspects of the present disclosure.

There are two types of sense and avoid systems used today for unmanned aerial vehicles (UAVs), also referred to as "drones": (1) A Ground Based Sense and Avoid (GBSAA) system that utilizes information from ground based sensors to depict air traffic for a remotely piloted UAV; and (2) An Airborne Sense and Avoid (ABSAA) system which utilizes information from onboard (i.e. on the UAV) sensors to detect traffic around the UAV and avoid other aircraft or UAVs. The GBSAA system is limited geographically to specific locations where the ground-based sensors are installed and the visible airspace around the installed sensors. ABSAA systems are not limited geographically, but have size, weight and power (SWaP) requirements/restrictions that limit the overall payload a typical UAV can carry. This limits the ABSAA system's ability to execute sense and avoid operations, especially in compliance with 14 CFR § 91.113 because the typical UAV cannot host the necessary sensors and computing resources to process all the sensor information on the UAV, without violating the SWaP restrictions and requirements.

The innovative technology and architecture disclosed herein extends the overall range of the GBSAA systems by using a mobile ground-based platform with a radar and one or more airborne monitoring vehicles, referred to as "chase drones" or "escort drones." The various computing tasks to implement sense and avoid operations are distributed between the GBSAA system, the escort drone and the UAV, referred to herein as an "Ownship"

As a preliminary note, the terms "component", "module", "system", and the like as used herein are intended to refer to a processor-related entity, either software-executing general purpose processor, hardware, firmware or a combination thereof. For example, a component is not limited to being, a process running on a hardware processor, a hardware processor, an object, an executable, a thread of execution, a program, and/or a computing device.

By way of illustration, both an executable code running on a computing device and the computing device can be a component. One or more components may reside within a process and/or thread of execution, and a component may be localized on one computing device and/or distributed between two or more computing devices. Also, these components can execute from various computer readable media having various data structures stored thereon. The components may communicate via local and/or remote processes such as in accordance with a signal having one or more data packets (e.g. data from one component interacting with another component in a local system, distributed system, and/or across a network).

Computer executable components can be stored, for example, on non-transitory, computer/machine readable media including, but not limited to, an ASIC (application specific integrated circuit), CD (compact disc), DVD (digital video disk), ROM (read only memory), hard disk, EEPROM (electrically erasable programmable read only memory), solid state memory device or any other electronic storage device, in accordance with the subject matter disclosed herein.

System 100: FIG. 1A shows a system 100, according to one aspect of the present disclosure. System 100 utilizes GBSAA and ABSAA technology in conjunction with a mobile ground-based platform (144) having a radar (188) to extend the geographic airspace for an Ownship 108 to fly in, beyond a visual line of sight. System 100 utilizes sensors on one or more mobile ground-based platform 144 and one or more escort drone 106 to extend the geographic airspace for the Ownship 108 and reduces susceptibility due to ground clutter. The various sensors are configured to communicate via wireless communication (e.g. cellular, satellite or any other communication type).

Because the sensors, are located on the escort drone 106 and the mobile ground-based platform 144, it does not increase the overall weight of the Ownship 108. This enables the Ownship 108 to fly farther, without geographic limitations or any additional weight. This extends the overall utility of the Ownship 108 to provide support for natural disaster recovery, law enforcement, fire fighters, military training and other civilian functions.

In yet another aspect, system 100 incorporates the air traffic control reporting system (ATC-RS) as described in U.S. Pat. No. 8,437,956 to rebroadcast the position of the Ownship 108 and positions of any radar detected, non-cooperative aircraft or UAV via an automatic dependent surveillance-broadcast (ADS-B) message. This enables a manned aircraft to improve its safety by becoming aware of non-equipped aircraft.

In yet another aspect, system 100 provides a counter unmanned aerial system (UAS) capability, that could, when required, be used to bring down an uncooperative drone to avoid mid-air collision with another airborne vehicle, including a commercial aircraft, commercial UAV or a military UAV.

Referring now to FIG. 1A in detail, system 100 includes a GBSAA fixed radar surveillance volume 104, a GBSAA system 102, one or more escort drones 106 and one or more mobile ground-based platforms 144 to sense and avoid other flying objects (e.g. other drones or aircraft) within an air space navigated by Ownship 108, as described below in detail. In one aspect, GBSAA system 102 can be included within a mobile ground-based platform 144 to provide "Sense and Avoid" support at any location without any existing infrastructure.

The GBSAA system 102 operates as a ground control center for the Ownship 108. The GBSAA system 102 includes an inorganic sensor wrapper 128, an ADS-B wrapper 130, an assess algorithm module 132 (may also be referred to as module 132), a classifier 134, a fusion tracker 136, a GCS (ground control station) wrapper 138 and a GCS flight command module 140 (may also be referred to as module 140) with a pilot-in-loop 142. The pilot-in the loop 142 is an individual that is actively involved in controlling Ownship 108. These various components may be implemented in software, hardware or a combination of hardware and software.

The escort drone 106 is equipped with an on-board radar 171, an ADS-B receiver 178, an ADS-B wrapper 176, as well as an on-board fusion tracker/classifier 174 (may also be referred to as fusion tracker/classifier 174), described below in detail.

Figure 1B:
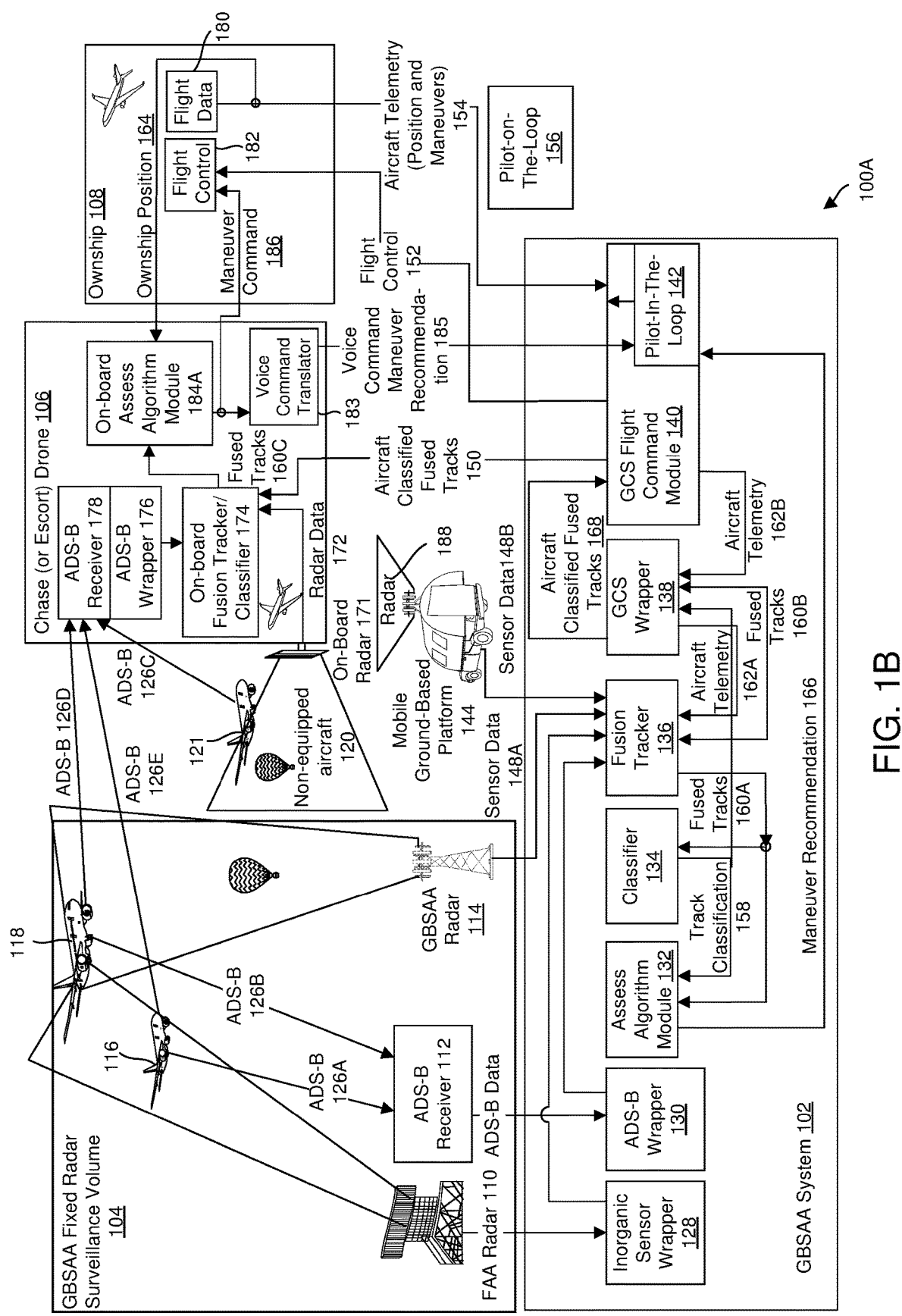
FIG. 1B shows another example of an innovative system architecture, according to various aspects of the present disclosure.

The Ownship 108 is at least equipped with a flight control module 182, a flight data module 180 and an onboard assess algorithm module 184 (may also be referred to as module 184), described below in detail. In another aspect, as shown in FIG. 1B, module 184 of FIG. 1A, shown as 184A, may be located at escort drone 106, described below in detail.

In one aspect, the GBSAA Fixed Radar Surveillance Volume 104 includes a Federal Aviation Administration (FAA) radar 110, an ADS-B receiver 112, and a GBSAA radar 114. ADS-B supports surveillance technology of an aircraft to determine its position via satellite navigation and periodically broadcasts it, enabling it to be tracked.

The FAA radar 110 maybe an Airport Surveillance Radar (ASR) or an Air Route Surveillance Radar (ARSR) and provides range and azimuth from aircraft that are not equipped with a transponder. The FAA radar 110 also provides "Mode C" (i.e. pressure altitude) and "Mode 3A" (i.e. a transponder code) from an aircraft that equipped with a transponder. Information from the FAA radar 110 is provided to the inorganic sensor wrapper 128. The inorganic sensor wrapper 128 provides the received information to the fusion tracker 136 for generating a single air track for each aircraft flying in the GB SAA Fixed Radar Surveillance Volume 104, as described below in detail. A transponder equipped aircraft allows 3D (three-dimensional) measurement of aircraft, while 2D measurements can be made for non-transponder equipped aircraft.

The ADS-B receiver 112 receives RF (radio frequency) from one or more aircraft, e.g. 116 and 118 that generate ADS-B outputs 126A and 126B, respectively. The ADS-B outputs 126A/126B from ADS-B receiver 112 are provided to the ADS-B wrapper 130 that provides 3D position data (e.g. latitude, longitude and altitude) and 3D velocity data to the fusion tracker 136.

In one aspect, the GBSAA radar 114 is a fixed radar used within GBSAA Fixed Radar Surveillance Volume 104. The GBSAA radar 114 outputs range, azimuth and elevation (3D measurement) (shown as sensor data 148A) of an aircraft to the fusion tracker 136.

In one aspect, radar 188 of the mobile ground-based platform 144 (e.g. an automobile) collects sensor data 148B, similar to sensor data 148A, and provides the same to the fusion tracker 136. Radar 188 provides coverage for a certain distance while it can communicate with the Ownship 108.

In one aspect, the fusion tracker 136 executes programmable instructions (e.g. by a sensor fusion engine) to integrate various measurements from multiple sources (e.g. FAA radar 110, ADS-B receiver 112, GBSAA radar 114, radar 188 and Ownship 108) into 3D tracks with position, velocity and accuracy information. As an example, to optimize computing resources, the fusion tracker 136 may use a filter e.g. a Kalman filter to filter outlier data received from the various sources described above. Examples of fusion tracker 136 include ARTAS (Air Traffic Management Surveillance Tracker and Server) and Phoenix, air traffic management and surveillance system. The adaptive aspects of the present disclosure are not limited to any specific type of fusion tracker 136.

In one aspect, the fusion tracker 136 generates fused tracks 160A that are provided to a classifier 134. The classifier 134 classifies the fused tracks as either aircraft or non-aircraft. An output 158 from the classifier 134 is then provided to module 132 and the GCS wrapper 138. To maintain safe operations, module 132, executing programmed instructions uses unmanned aircraft positions in conjunction with positions and velocities of other air traffic to determine a lateral maneuver (166) for the Ownship 108.

The fusion tracker 136 also provides fused tracks 160B to the GCS wrapper 138. The GCS wrapper 138 combines the fused tracks 160B and the track classification 158 received from the classifier 134 to generate aircraft classified fused tracks 168 that are provided to module 140. Based on that, module 140 provides aircraft classified fused tracks 150 to the fusion tracker/classifier 174, as described below in detail.

In one aspect, module 140 of the GBSAA system 102 receives aircraft telemetry data 154 from Ownship 108 and forwards the telemetry data (shown as 162B) to the GCS wrapper 138. The GCS wrapper 138 then provides Ownship position data (shown as aircraft telemetry 162A) to the fusion tracker 136 that generates fused tracks 160A for classifier 134 and GCS wrapper 138.

In one aspect, as mentioned above, the escort drone 106 includes the ADS-B receiver 178 and the ADS-B wrapper 176. The ADS-B receiver 178 receives RF transmission 126C, 126D and 126E from other aircraft 121, 118 and 116, respectively. The ADS-B wrapper 176 receives the ADS broadcast messages and provides that information to the fusion tracker/classifier 174. The escort drone 106 also includes the on-board radar 171 that detects a non-equipped aircraft 120. The radar data 172 from the non-equipped aircraft 120 is also provided to the fusion tracker/classifier 174.

In one aspect, the fusion tracker/classifier 174 fuses radar data 172 and information received from ADS-B wrapper 176 with aircraft classified fused tracks (150) received from module 140. The fused tracks 150 that are classified as aircraft are provided to the on-board fusion tracker/classifier 174. The classifier portion of the fusion tracker/classifier 174 classifies any tracks that have been detected by on-board sensors (i.e. radar 171 and/or ADS-B wrapper 176) and aircraft classified fused tracks 150. If the ground-based system 102 classifies a fused track as an aircraft, the classifier of the fusion tracker/classifier 174 does not attempt to reclassify that information.

In one aspect, the Ownship 108 provides flight data 180 as aircraft telemetry data 154 to module 140. The flight control module 182 receives flight control commands 152 from the module 140. In one aspect, module 184 of the Ownship 108 receives fused tracks 160C from the escort drone 106, and its own position 164 from flight data 180. Based on the received information, a maneuver command 186 for the flight control module 182 is generated by module 184. The maneuver commands are sent to the autopilot of the Ownship 108 for autonomous control and provides maneuver situational awareness for a pilot-on-the-loop 156. The pilot-on-the-loop 156 is an individual that receives information but unlike, the pilot-in-the loop 142, is monitoring autonomous activity and prepared to take over control but is not actively controlling Ownship 108.

FIG. 1B shows a system 100A, in another aspect of the present disclosure. System 100 and 100A have various common components, and for brevity sake, the various common components are not described again. In one aspect, module 184 of Ownship 108 is located at escort drone 106, shown as module 184A. In this aspect, Ownship 108 provides Ownship position 164 to module 184A. Module 184A receives fused tracks 160C from the fusion tracker/classifier 174 and generates maneuver commands 186 for Ownship 108. The maneuver commands 186 are also provided to a voice command translator 183 that provides voice command maneuver recommendations 185 for the pilot-in-loop 142.

In one aspect, system 100A does not add any weight to Ownship 108 or additional power requirements because module 184A is located and executed from drone 106. This enables the Ownship 108 to fly farther, without geographic limitations or any additional weight. This extends the overall utility of the Ownship 108 to provide support for natural disaster recovery, law enforcement, fire fighters, military training and other civilian functions.

Figure 2A:
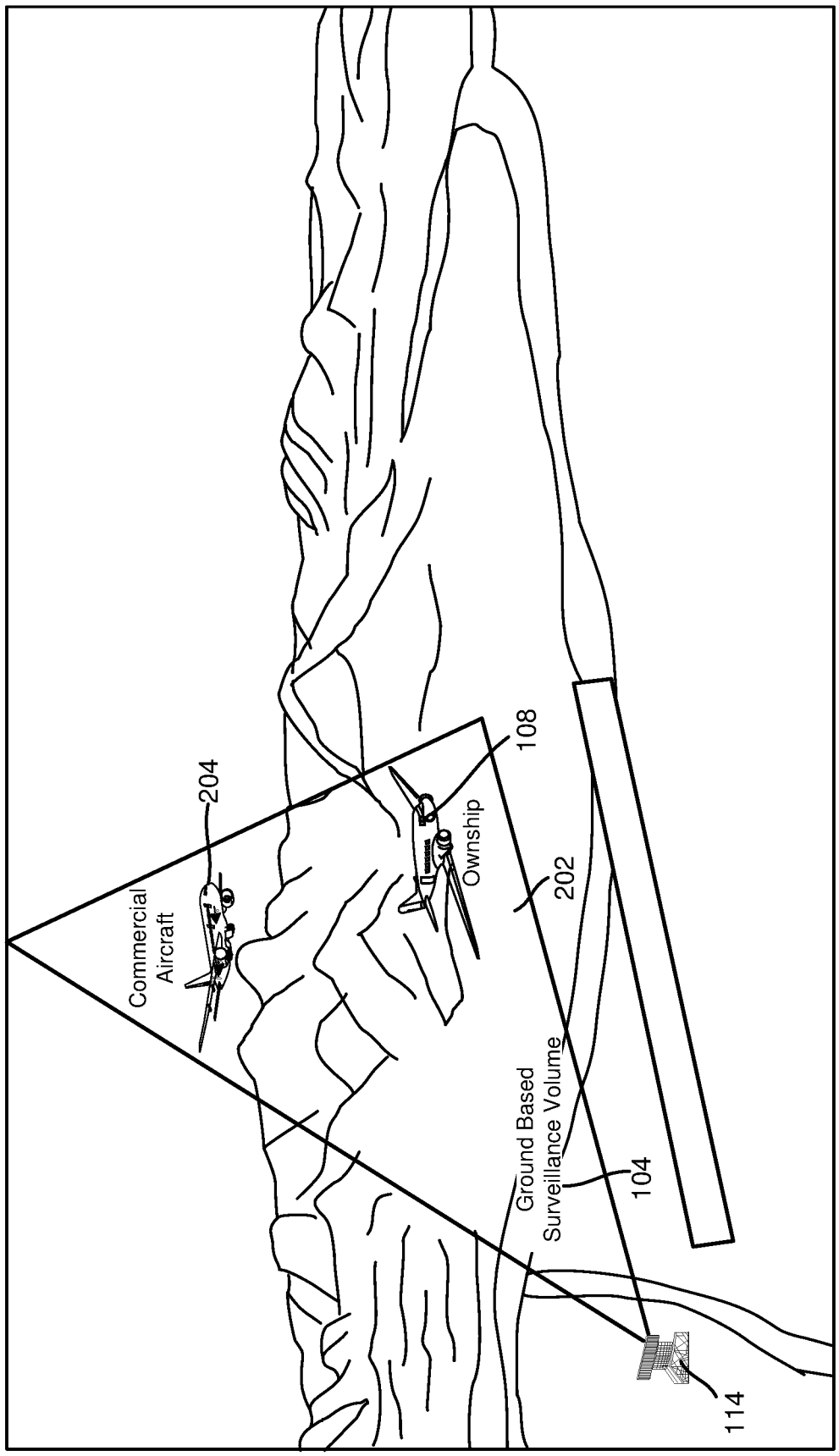
FIG. 2A show a transit corridor provided by a ground-based radar system, according to various aspects of the present disclosure.

Ownship Transit Corridor: FIGS. 2A-2F show examples of using the innovative architecture and technology of system 100 for providing a safe and extended transit corridor for Ownship 108, without additional weight, according to one aspect of the present disclosure. FIG. 2A shows Ownship 108 launched from the ground within the ground-based coverage in area 202. The coverage area 202 (or transit corridor 202) is based on using the FAA radar 110 and/or GBSAA radar 114. A commercial aircraft 204 within area 202 can be detected using the ground-based radar 110 and/or 114. The Ownship 108 using flight control commands 152 can avoid aircraft 204.

Figure 2B:
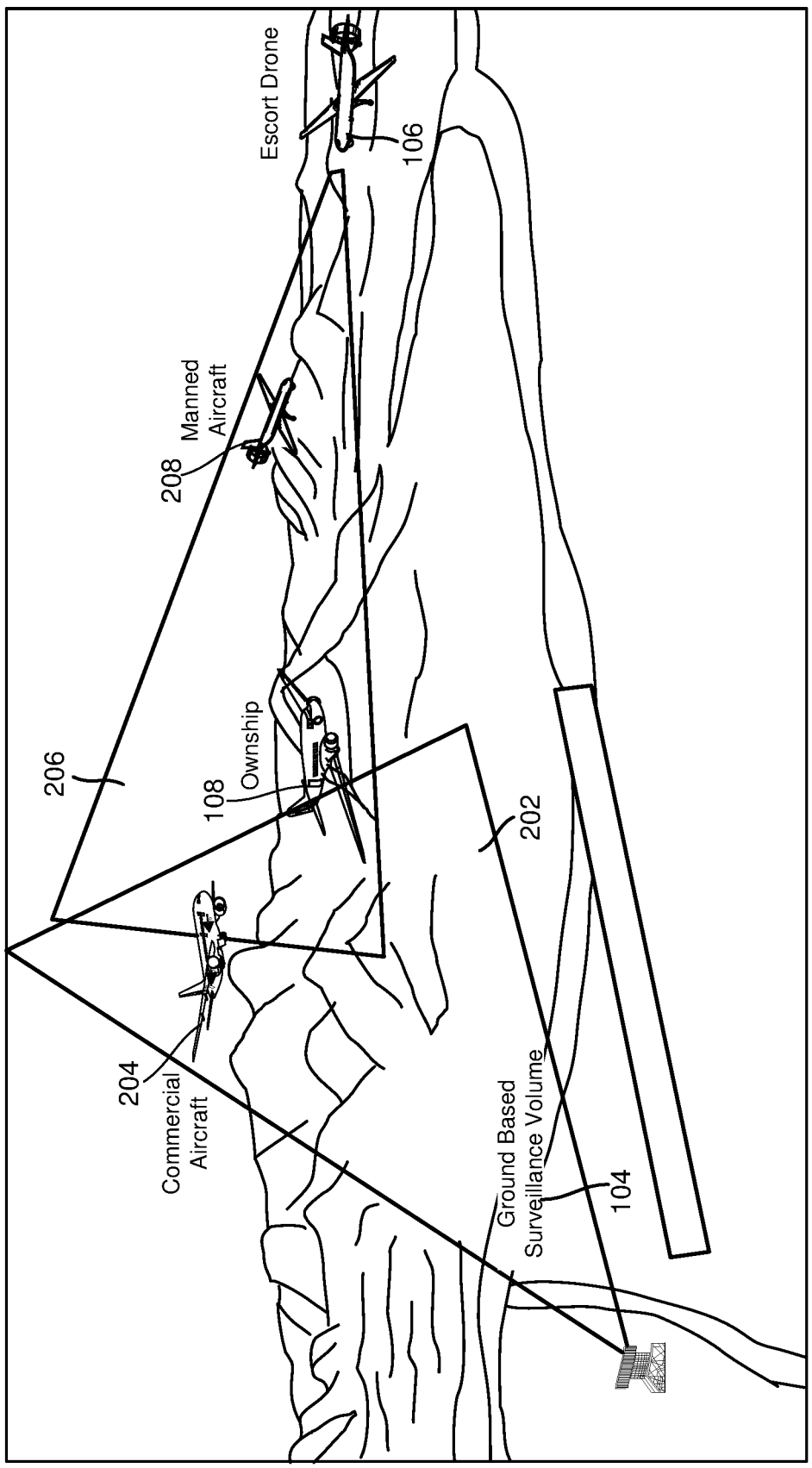
FIG. 2B show overlapping transit corridors provided by a ground-based radar system and an escort drone, according to various aspects of the present disclosure.

FIG. 2B shows a transition of Ownship 108 from the ground-based coverage area 202 into airborne coverage area (or transit corridor) 206 that is managed by the escort drone 106. A manned aircraft 208 can be detected by the escort drone 106 and that information is used to maneuver Ownship 108 to avoid a mid-air collision.

Figure 2C:
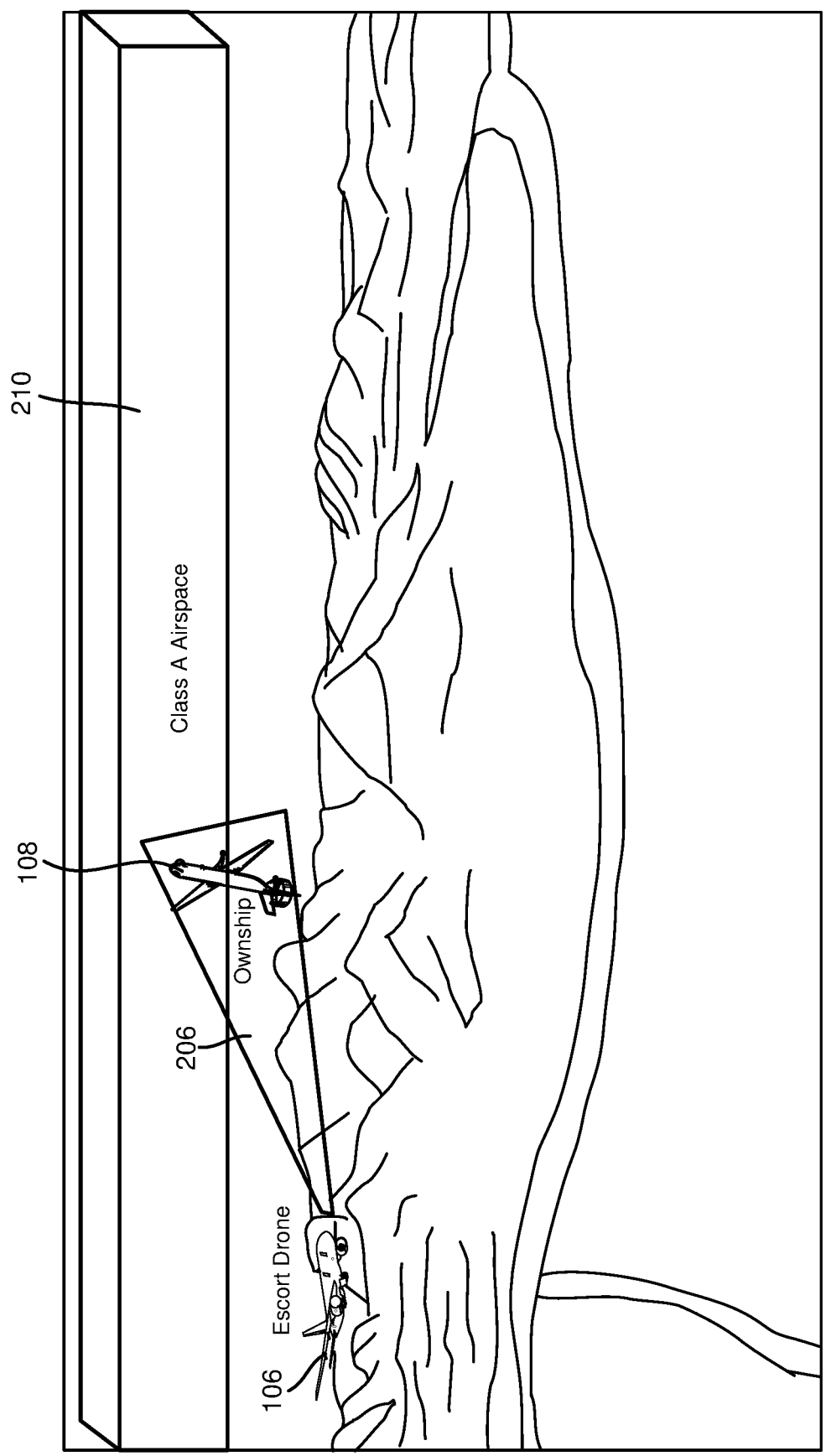
FIG. 2C show a transit corridor provided by an escort UAV before a UAV (also referred to as "Ownship") enters Class A airspace, according to various aspects of the present disclosure.
Figure 2D:
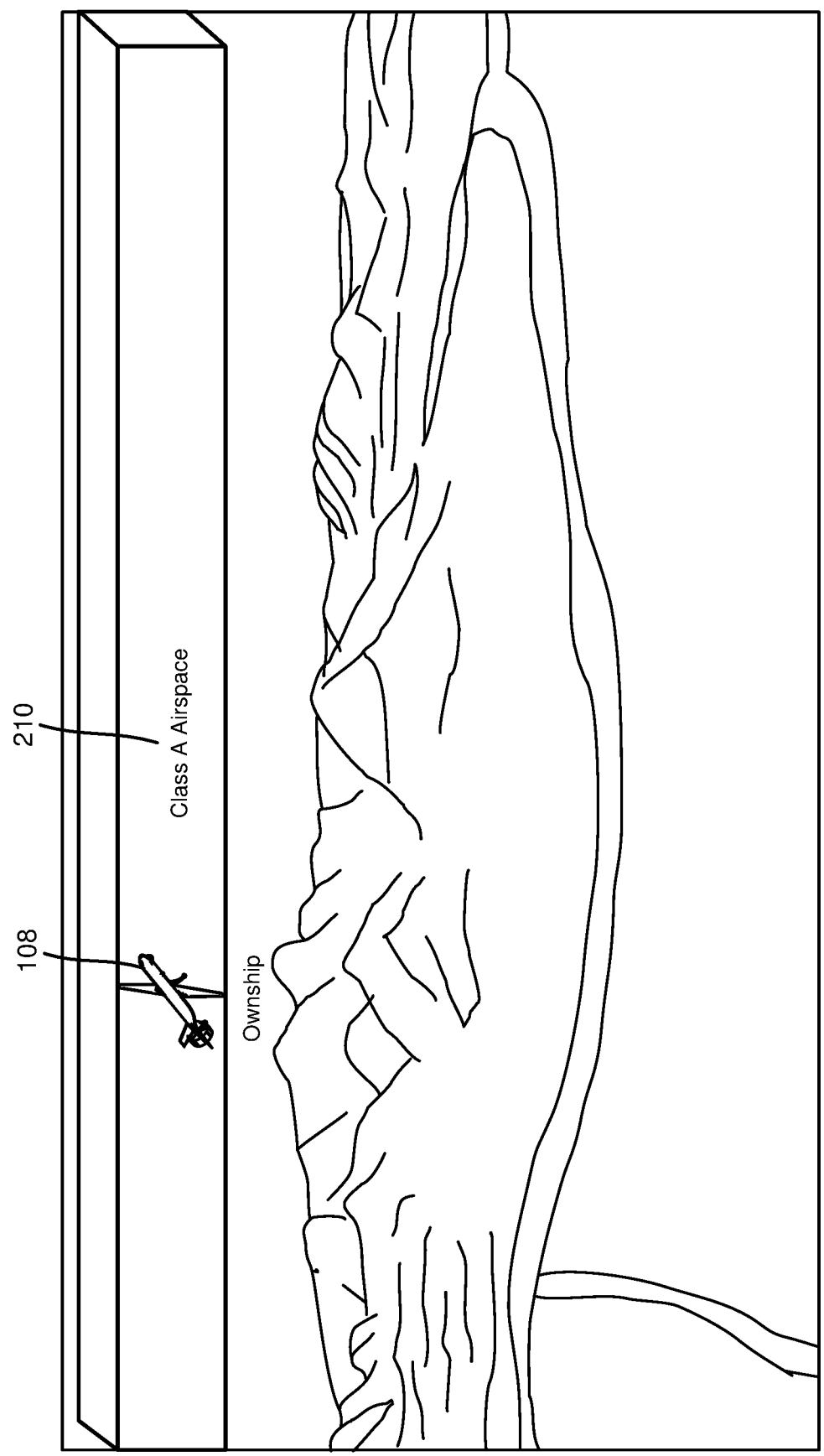
FIG. 2D shows the UAV in the Class A Airspace after flying through the transit corridor shown in FIG. 2C, according to various aspects of the present disclosure.

FIG. 2C shows the Ownship 108 transitioning from the coverage area 206 into Class A airspace 210. Class A airspace is designated between 18,000 feet-60,000 feet. 14 CFR § 91.113 requirements do not apply within Class A airspace because all traffic is based on instrument flight rules (IFR). The Ownship 108 may continue to its destination in the Class A airspace, as shown in FIG. 2D.

Figure 2E:
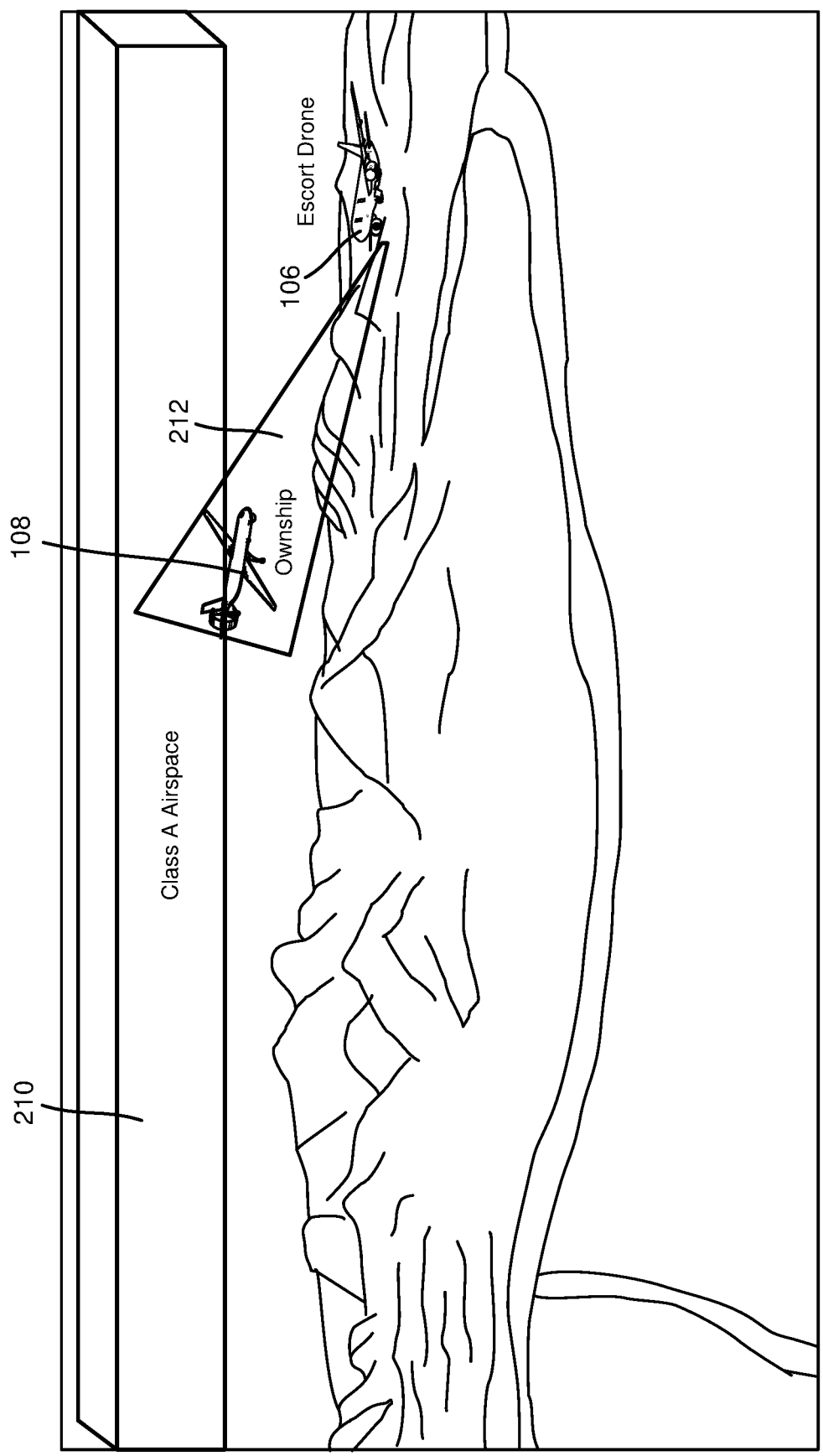
FIG. 2E shows the UAV descending the Class A Airspace in a transit provided by an escort drone, according to various aspects of the present disclosure.

FIG. 2E shows the descent of Ownship 108 from the Class A airspace 210 to a coverage area (or transit corridor) 212 provided by another escort drone 106.

Figure 2F:
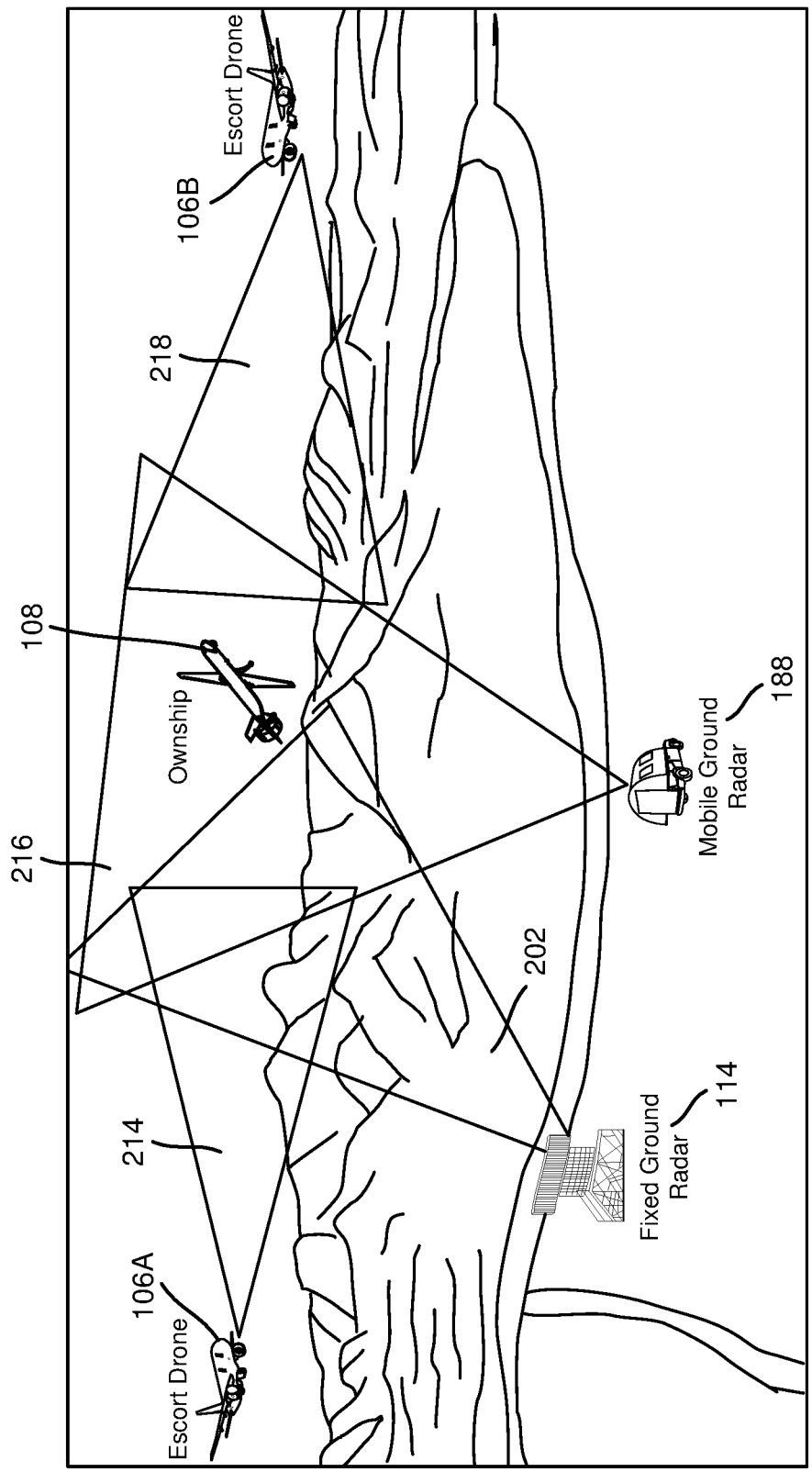
FIG. 2F show multiple transit corridors provided by a ground-based radar system, escort UAVs and a mobile ground-based radar system, according to various aspects of the present disclosure.

FIG. 2F shows a transit corridor for Ownship 108 with multiple, overlapping coverage areas 202, 214, 216 and 218 provided by different components of system 100. Coverage area 202 is provided by the fixed ground radar 114 (and/or FAA radar 110), the coverage area 214 is provided by the escort drone 106A (similar to escort drone 106 described above), coverage area 216 is provided by the mobile ground radar 188 on the mobile ground-based platform 144, and coverage area 218 is provided by another escort drone 106B (similar to escort drone 106). The various coverage areas provide a safe transit corridor for the Ownship 108, without adding additional weight on Ownship 108. Any airborne device within the aforementioned coverage areas are efficiently detected and avoided.

Figure 3:
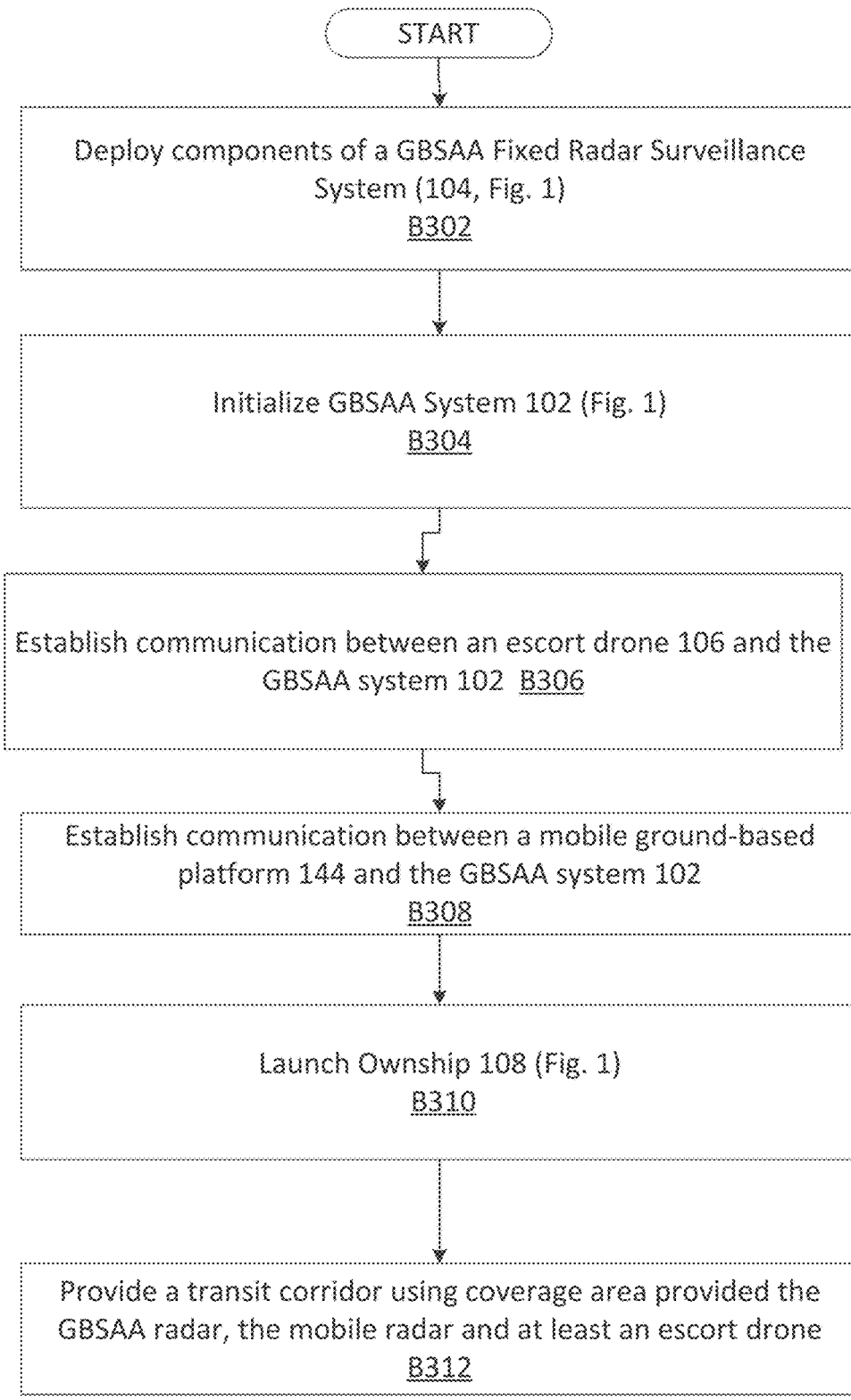
FIG. 3 shows an example of a process flow for deploying various components of the system of FIGS. 1A/1B, according to various aspects of the present disclosure.

Process Flow: FIG. 3 shows a process 300 for configuring and deploying the various components of system 100, described above, according to one aspect of the present disclosure. Process 300 begins in block B302, when the GBSAA Fixed Radar Surveillance Volume 104 is initialized and deployed in the field. The FAA radar 110 is initialized to communicate with aircraft within the radar's range. The GBSAA radar 114 is also activated to capture any radar data and provide it to the fusion tracker 136. The ADS-B receiver 112 is activated to receive ADS-B messages from aircraft 116, 118 and others.

In block B304, the GBS system 102 is also initialized and activated. The various components of the GBS system 102, namely, the inorganic sensor wrapper 128, the ADS-B wrapper 130, module 132, the classifier 134, the fusion tracker 136, the GCS wrapper 138 and module 140 are powered on and operational.

In block B306, module 140 of the GBSAA system 102 establishes communication with the escort drone 106. The communication maybe cellular or via satellite. This enables module 150 to upload aircraft classified tracks 150, as described above.

In block B308, communication between the mobile ground-based platform 144 and GBSAA system 102 is established. This enables the mobile ground-based platform 144 to transmit sensor data 148A to the fusion tracker 136.

In block B310, Ownship 108 is launched. In block B312, a transit corridor, an example of which is shown in FIG. 2F is provided using the GBSAA radar 114, the mobile radar 188 and at least one escort drone 106. This enables the Ownship 108 to safely navigate the airspace, in compliance with 14 CFR § 91.113, without having to add any additional weight. Details of providing the transit corridor are provided below with respect to FIGS. 4A-4B.

Figure 4A:
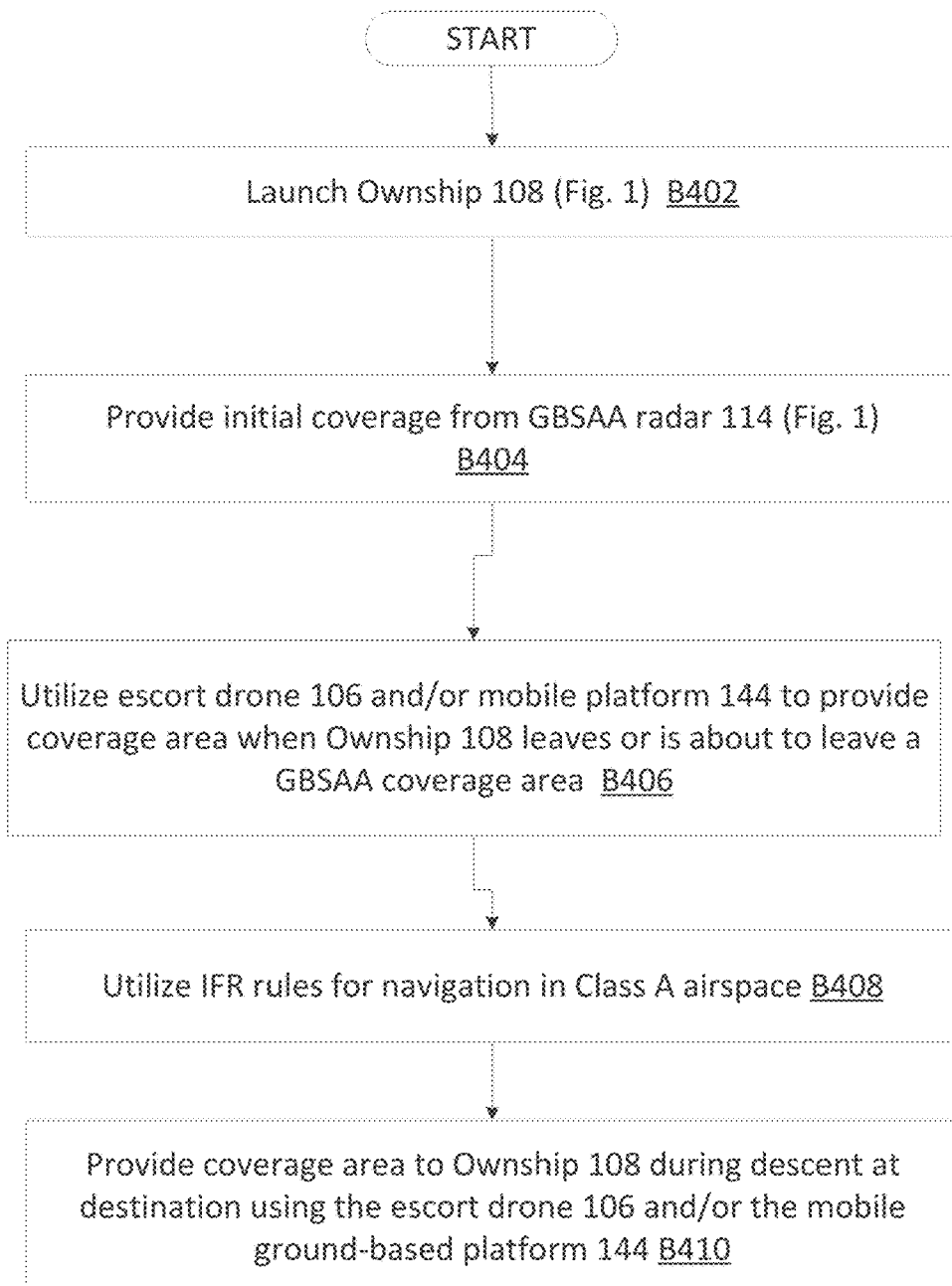
FIG. 4A shows an example of a process flow for providing a transit corridor to a UAV using the system of FIGS. 1A/1B, according to various aspects of the present disclosure.

FIG. 4A shows a process 400, according to one aspect of the present disclosure. Process 400 begins after the process blocks B302-B308 of FIG. 3 have been executed. In block B402, the Ownship 108 is launched. In block B404, the initial coverage for safe airspace is provided based on data from the GBSAA radar 114, as shown in FIG. 2A.

In block B406, the escort drone 106 and/or the mobile ground-based platform 114 are used to provide coverage for safe airspace. An example of the escort drone 106 provided coverage is shown as 206 in FIG. 2B, while the mobile ground-based platform 144 coverage is shown as 216 in FIG. 2F.

In block B408, if the Ownship 108 enters Class A airspace 210 (see FIG. 2D), then IFR based navigation is used to travel.

In block B410, when the Ownship 108 starts its descent, the coverage maybe provided by the escort drone 106B (see FIG. 2E) or another mobile platform, similar to mobile ground-based platform 144, described above.

Figure 4B:
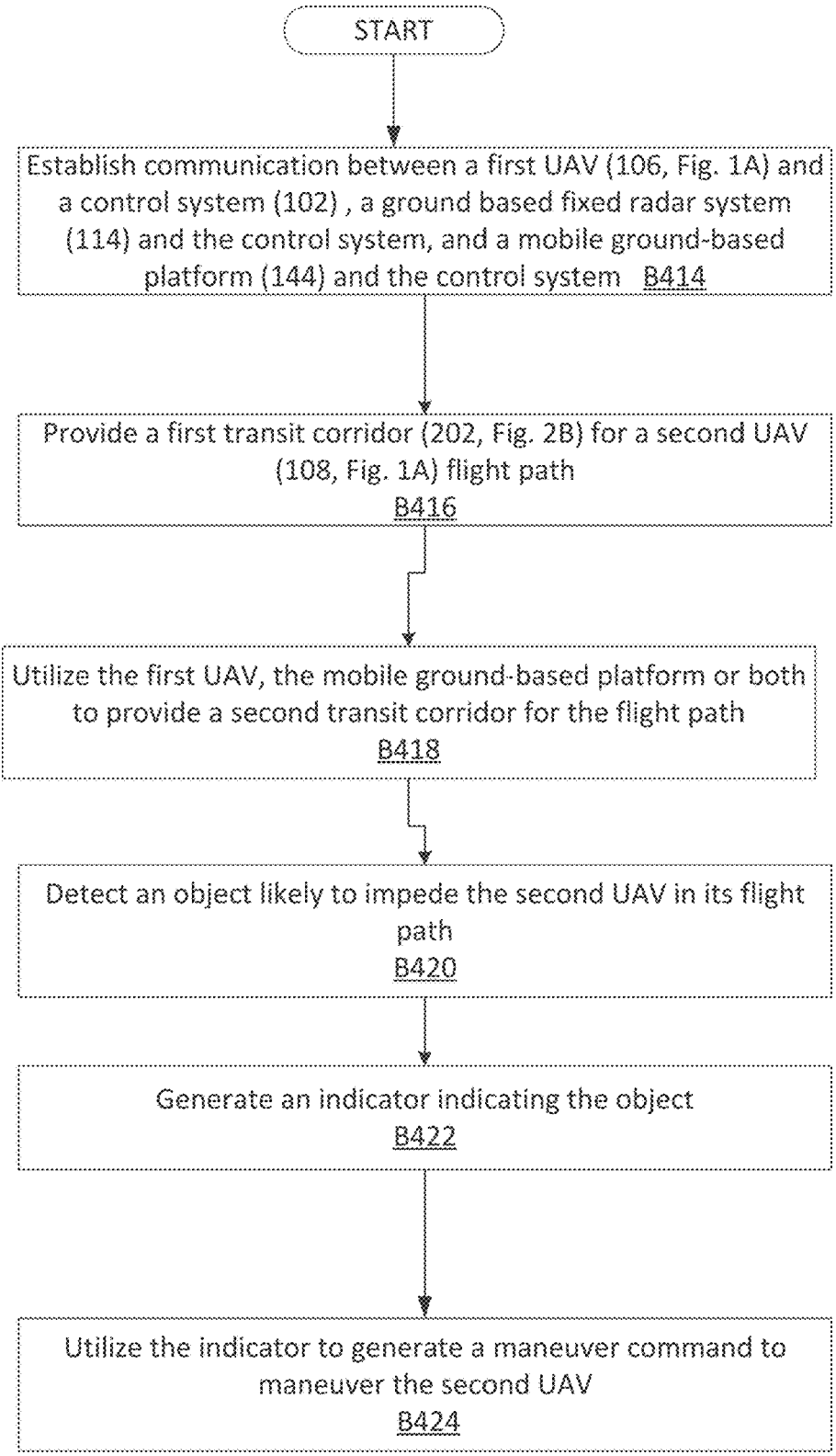
FIG. 4B shows another example of a process flow for providing a transit corridor to a UAV using the system of FIGS. 1A/1B, according to various aspects of the present disclosure.

FIG. 4B shows a process 412, according to one aspect of the present disclosure. In block B414, communication is established between a first UAV (e.g. the escort drone 106, FIG. 1A) and a control system (e.g. 102, FIG. 1A), a mobile ground-based platform (e.g. 144) and the control system, and a ground-based radar surveillance system (e.g. 114) and the control system. The control system is also configured to communicate with a second UAV (e.g. Ownship 108).

In block B416, a first transit corridor (e.g. coverage area 202, FIG. 2F) is provided for a flight path of the second UAV, based on coverage provided by the ground-based radar surveillance system. In block B418, based on the coverage provided by the first UAV, the mobile ground-based platform or both the first UAV and the mobile ground-based platform, a second transit corridor (e.g. coverage area 214 and/or 216, FIG. 2F) is provided for the flight path of the second UAV.

In block B420, the control system detects an object (e.g. another flying machine) that is likely to impede the second UAV flight within the flight path, the object is detected based on data provided by the mobile ground-based platform, the ground-based radar surveillance system or both the ground-based radar surveillance system and the mobile ground-based platform. An example of the data is shown as 148A, 148B, 110 and the ADS-B 126A/126B.

In block B422, the control system generates an indicator (e.g. 150, FIG. 1A) indicating the object in the flight path. The indicator can then be used to generate a maneuver command (e.g. 186, FIG. 1A/1B) in block B424. For example, the control system transmits the indicator to the first UAV; the first UAV generates a maneuver command (186) for the second UAV, based on the indicator and data collected by the first UAV. In another aspect, the control system transmits the indicator to the first UAV; and the second UAV generates a maneuver command, based on the indicator received from the first UAV. The second UAV uses the maneuver command to steer the second UAV to avoid the object.

In one aspect, methods and systems for unmanned aerial vehicles are provided. One method includes receiving, by a control system (e.g. 102, FIGS. 1A/1B), sensor data from a mobile ground-based platform and sensor data from a ground-based radar surveillance system (e.g. 114), the control system configured to communicate with a first UAV (e.g. 106) and a second UAV (e.g. 108); detecting, by the control system, an object likely to impede the second UAV flight within a flight path, the object detected based on the sensor data received from the mobile ground-based platform, the ground-based radar surveillance system or both the ground-based radar surveillance system (e.g. 114) and the mobile ground-based platform (e.g. 144); generating, by the control system, an indicator (e.g. 150) indicating an object in the flight path; and transmitting, by the control system, the indicator to the first UAV.

In yet another aspect, another method is provided. The method includes receiving, by a control system, sensor data from a mobile ground-based platform and sensor data from a ground-based radar surveillance system, the control system configured to communicate with a first UAV and a second UAV; detecting, by the control system, an object likely to impede the second UAV flight within a flight path, the object detected based on the sensor data received from the mobile ground-based platform, the ground-based radar surveillance system or both the ground-based radar surveillance system and the mobile ground-based platform; generating, by the control system, an indicator indicating an object in the flight path; and transmitting, by the control system, the indicator to the first UAV.

In another aspect, a non-transitory, machine-readable storage medium having stored thereon instructions for performing a method is provided. The instructions comprising machine executable code which when executed by at least one machine, causes the machine to: establish communication between a first UAV and a control system, a mobile ground-based platform and the control system and a ground-based radar surveillance system and the control system, the control system configured to communicate with a second UAV; provide a first transit corridor for a flight path of the second UAV, based on coverage provided by the ground-based radar surveillance system; utilize, the first UAV, the mobile ground-based platform or both the first UAV and the mobile ground-based platform for providing a second transit corridor for the flight path of the second UAV; detect, by the control system, an object likely to impede the second UAV flight within the flight path, the object detected based on data provided by the mobile ground-based platform, the ground-based radar surveillance system or both the ground-based radar surveillance system and the mobile ground-based platform; and generate, by the control system, an indicator indicating an object in the flight path.

Processing System: FIG. 5 is a high-level block diagram showing an example of the architecture of a processing system 500 that may be used according to one aspect of the present disclosure. The processing system 500 can be deployed for implementing the fusion tracker 136, module 132, the classifier 134, the ADS-B wrapper 130, the inorganic sensor wrapper 128, the GCS wrapper 138, module 140, the fusion tracker/classifier 174, the ADS-B receiver 178 and ADS-B wrapper 176, module 184 or any other computing device of system 100 (FIG. 1A). Note that certain standard and well-known components which are not germane to the present aspects are not shown in FIG. 5.

The processing system 500 includes one or more processor(s) 502 and memory 504, coupled to a bus system 505. The bus system 505 shown in FIG. 5 is an abstraction that represents any one or more separate physical buses and/or point-to-point connections, connected by appropriate bridges, adapters and/or controllers. The bus system 505, therefore, may include, for example, a system bus, a Peripheral Component Interconnect (PCI) bus, a HyperTransport or industry standard architecture (ISA) bus, a small computer system interface (SCSI) bus, a universal serial bus (USB), or an Institute of Electrical and Electronics Engineers (IEEE) standard 1394 bus (sometimes referred to as "Firewire") or any other interconnect type.

The processor(s) 502 are the central processing units (CPUs) of the processing system 500 and, thus, control its overall operation. In certain aspects, the processors 502 accomplish this by executing software stored in memory 504. A processor 502 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

Memory 504 represents any form of random-access memory (RAM), read-only memory (ROM), flash memory, or the like, or a combination of such devices. Memory 504 includes the main memory of the processing system 500. Instructions 506 may be used to execute process steps of FIGS. 3-4A/4B described above, any associated data structures as well as instructions for executing the various modules/components of system 100.

Also connected to the processors 502 through the bus system 505 are one or more internal mass storage devices 510, and a network adapter 512. Internal mass storage devices 510 may be or may include any conventional medium for storing data in a non-volatile manner, such as one or more magnetic or optical based disks, flash memory, or solid-state drive.

The network adapter 512 provides the processing system 500 with the ability to communicate with remote devices (e.g., over a network) and may be, a cellular modem, a Wi-Card, a device for enabling satellite communication or the like.

The processing system 500 also includes one or more input/output (I/O) devices 508 coupled to the bus system 505. The I/O devices 508 may include, for example, a display device, a keyboard, a mouse, etc.

Thus, methods and systems sense and avoid technology for UAVs have been described. Note that references throughout this specification to "one aspect" (or "embodiment") or "an aspect" mean that a particular feature, structure or characteristic described in connection with the aspect is included in at least one aspect of the present disclosure. Therefore, it is emphasized and should be appreciated that two or more references to "an aspect" or "one aspect" or "an alternative aspect" in various portions of this specification are not necessarily all referring to the same aspect. Furthermore, the features, structures or characteristics being referred to may be combined as suitable in one or more aspects of the disclosure, as will be recognized by those of ordinary skill in the art.

While the present disclosure is described above with respect to what is currently considered its preferred aspects, it is to be understood that the disclosure is not limited to that described above. To the contrary, the disclosure is intended to cover various modifications and equivalent arrangements within the spirit and scope of the appended claim.

What is claimed is:

1. A method, comprising:
    establishing communication between a first unmanned aerial vehicle (UAV) and a control system, a mobile ground-based platform and the control system and a ground-based radar surveillance system and the control system, the control system configured to communicate with a second UAV while the first UAV and the second UAV are in flight;
    providing a first transit corridor for a flight path of the second UAV, based on a first coverage area provided only by the ground-based radar surveillance system;
    providing a second coverage area provided only by the first UAV;
    providing a third coverage area provided only by the mobile ground-based radar surveillance system;
    utilizing, the first UAV, the mobile ground-based platform or both the first UAV and the mobile ground-based platform for providing a second transit corridor for the flight path of the second UAV based on the second UAV transitioning from one of the first coverage area, the second coverage area and the third coverage area to a different coverage area;
    detecting, by the control system, an object likely to impede the second UAV within the flight path, the object detected based on data provided by the mobile ground-based platform, the ground-based radar surveillance system or both the ground-based radar surveillance system and the mobile ground-based platform;
    detecting, by the control system, that the second UAV is transitioning from the second coverage area and into a Class A airspace; and
    generating, by the control system, an indicator indicating an object in the flight path.

2. The method of claim 1, further comprising:
    transmitting, by the control system, the indicator to the first UAV;
    generating, by the first UAV, a maneuver command for the second UAV, based on the indicator and data collected by the first UAV; and
    utilizing, by the second UAV, the maneuver command to steer the second UAV to avoid the object.

3. The method of claim 1, further comprising:
    transmitting, by the control system, the indicator to the first UAV;
    generating, by the second UAV, a maneuver command, based on the indicator received from the first UAV; and
    utilizing, by the second UAV, the maneuver command to steer the second UAV to avoid the object.

4. The method of claim 1, further comprising:
receiving, by the control system, sensor data from the mobile ground-based platform, sensor data from the ground-based radar surveillance system and telemetry data from the second UAV; and
detecting, by the control system, the object in the flight path, based on the sensor data from the mobile ground-based platform, the sensor data from the ground-based radar surveillance system and telemetry data from the second UAV.

5. The method of claim 1, further comprising:
utilizing, the second transit corridor for the first UAV descent.

6. The method of claim 1, wherein the first corridor and the second corridor overlap to enable the second UAV to travel without impediment in the flight path.

7. The method of claim 1, wherein the first corridor overlaps with the second corridor and the second corridor overlaps with the first corridor and a third corridor provided by a third UAV to enable the second UAV to travel without impediment in the flight path.

8. The method of claim 1, further comprising detecting, by the control system, that the second UAV is transitioning from the Class A airspace into a fourth coverage area provided only by a third UAV.

9. A non-transitory, machine-readable storage medium having stored thereon instructions for performing a method, comprising machine executable code which when executed by at least one machine, causes the machine to:
establish communication between a first unmanned aerial vehicle (UAV) and a control system, a mobile ground-based platform and the control system and a ground-based radar surveillance system and the control system, the control system configured to communicate with a second UAV while the first UAV and the second UAV are in flight;
provide a first transit corridor for a flight path of the second UAV, based on a first coverage area provided only by the ground-based radar surveillance system;
provide a second coverage area provided only by the first UAV;
provide a third coverage area provided only by the mobile ground-based radar surveillance system;
utilize, the first UAV, the mobile ground-based platform or both the first UAV and the mobile ground-based platform for providing a second transit corridor for the flight path of the second UAV based on the second UAV transitioning from one of the first coverage area, the second coverage area and the third coverage area to a different coverage area;
detect, by the control system, an object likely to impede the second UAV within the flight path, the object detected based on data provided by the mobile ground-based platform, the ground-based radar surveillance system or both the ground-based radar surveillance system and the mobile ground-based platform;
detect, by the control system, that the second UAV is transitioning from the second coverage area and into a Class A airspace; and
generate, by the control system, an indicator indicating an object in the flight path.

10. The non-transitory, machine-readable storage medium of claim 9, wherein the machine executable code which when executed by at least one machine, further causes the machine to:
transmitting, by the control system, the indicator to the first UAV;
generating, by the first UAV, a maneuver command for the second UAV, based on the indicator and data collected by the first UAV; and
utilizing, by the second UAV, the maneuver command to steer the second UAV to avoid the object.

11. The non-transitory, machine-readable storage medium of claim 9, wherein the machine executable code which when executed by at least one machine, further causes the machine to:
transmitting, by the control system, the indicator to the first UAV;
generating, by the second UAV, a maneuver command, based on the indicator received from the first UAV; and
utilizing, by the second UAV, the maneuver command to steer the second UAV to avoid the object.

12. The non-transitory, machine-readable storage medium of claim 9, wherein the machine executable code which when executed by at least one machine, further causes the machine to:
receiving, by the control system, sensor data from the mobile ground-based platform, sensor data from the ground-based radar surveillance system and telemetry data from the second UAV; and
detecting, by the control system, the object in the flight path, based on the sensor data from the mobile ground-based platform, the sensor data from the ground-based radar surveillance system and telemetry data from the second UAV.

13. The non-transitory, machine-readable storage medium of claim 9, wherein the machine executable code which when executed by at least one machine, further causes the machine to:
utilizing, the second transit corridor for the first UAV descent.

14. The non-transitory, machine-readable storage medium of claim 9, wherein the first corridor and the second corridor overlap to enable the second UAV to travel without impediment in the flight path.

15. The non-transitory, machine-readable storage medium of claim 9, wherein the first corridor overlaps with the second corridor and the second corridor overlaps with the first corridor and a third corridor provided by a third UAV to enable the second UAV to travel without impediment in the flight path.

16. A method, comprising:
receiving, by a control system, sensor data from a mobile ground-based platform and sensor data from a ground-based radar surveillance system, the control system configured to communicate with a first unmanned aerial vehicle (UAV) and a second UAV while the first UAV and the second UAV are in flight;
providing a first transit corridor for a flight path of the second UAV, based on coverage provided only by the ground-based radar surveillance system;
utilizing, the first UAV, the mobile ground-based platform or both the first UAV and the mobile ground-based platform for providing a second transit corridor for the flight path of the second UAV based on the second UAV transitioning from one of the first coverage area, the second coverage area and the third coverage area to a different coverage area;
detecting, by the control system, an object likely to impede the second UAV flight within a flight path, the object detected based on the sensor data received from the mobile ground-based platform, the ground-based radar surveillance system or both the ground-based radar surveillance system and the mobile ground-based platform;

generating, by the control system, an indicator indicating an object in the flight path;

detecting, by the control system, that the second UAV is transitioning from the second coverage area and into a Class A airspace; and transmitting, by the control system, the indicator to the first UAV.

17. The method of claim 16, further comprising:

generating, by the first UAV, a maneuver command for the second UAV, based on the indicator and data collected by the first UAV; and utilizing, by the second UAV, the maneuver command to steer the second UAV to avoid the object.

18. The method of claim 17, further comprising:

receiving, by the first UAV, a position of the second UAV; and utilizing, by the first UAV, the position, the indicator and data collected by the first UAV to generate the maneuver command.

19. The method of claim 16, further comprising:

utilizing, by the first UAV, the indicator from the control system and data collected by the first UAV to update the indicator;

transmitting, by the first UAV, the updated indicator to the second UAV.

20. The method of claim 16, further comprising:

generating, by the second UAV, a maneuver command, based on the updated indicator received from the first UAV; and utilizing, by the second UAV, the maneuver command to steer the second UAV to avoid the object.

* * * * *